United States Patent [19]
Nilsson

[11] 3,780,554
[45] Dec. 25, 1973

[54] METHOD OF MANUFACTURING EXTRUDED RODS OF WIRE FROM COMPOUND MATERIAL

[75] Inventor: Jan Nilsson, Robertsfors, Sweden

[73] Assignee: Allmanna Svenska Elektreska Aktiebolaget, Vasteras, Sweden

[22] Filed: Feb. 7, 1972

[21] Appl. No.: 224,089

[30] Foreign Application Priority Data
Feb. 12, 1971 Sweden..........................1845/71

[52] U.S. Cl.................... 72/60, 72/258, 72/467, 29/474.3
[51] Int. Cl. ............................................ B21c 23/22
[58] Field of Search................... 72/60, 253, 467, 72/258; 29/474.3

[56] References Cited
UNITED STATES PATENTS
3,620,059  11/1971  Nilsson .................................. 72/60
2,218,459  10/1940  Singer.................................... 72/467

Primary Examiner—Richard J. Herbst
Attorney—Jennings Bailey, Jr.

[57] ABSTRACT

A rod or wire having an aluminum or aluminum alloy core and a copper or copper alloy casing is produced by hydrostatic extrusion of a compound billet through a die having a conical inlet with a cone angle of between 93° and 115°.

2 Claims, 2 Drawing Figures

METHOD OF MANUFACTURING EXTRUDED RODS OF WIRE FROM COMPOUND MATERIAL

BACKGROUND OF THE INVENTION

1. Field of the Invention

The present invention relates to a method of manufacturing rods or wire of compound material having a core of aluminum or an aluminum alloy and a casing of copper or a copper alloy surrounding the core, by means of hydrostatic extrusion.

2. The Prior Art

It is known to use a compound billet for such an extrusion process, which billet consists of a core of aluminum and a casing of copper tubing surrounding the core. The billet is placed in a pressure chamber containing a pressure medium. Under the influence of a high all-sided hydrostatic pressure, the billet is extruded through an opening in a die and is thus shaped to a product with the desired cross-section. In order to join the core and the casing, they are sealed together at the rear end of the billet, for example with a sealing ring or a lid of elastomeric material which prevents the pressure medium from penetrating between the core and the surrounding tube.

The prior applications of Burstrom, Ser. No. 32,195, filed Apr. 27, 1970, now U.S. Pat. No. 3,654,687 and Nilsson, Ser. No. 758,308, filed Sept. 9, 1968, now U.S. Pat. No. 3,620,059, describe hydrostatic extrusion of compound products using a core of one material and a casing of another material. The die used for the extrusion process has a conical inlet opening. For hydrostatic extrusion the cone is normally very pointed, having a cone angle of about 45°. The use of dies with such pointed cones has produced satisfactory results when extruding homogenous material and if it is possible to perform the extrusion at relatively low pressure. So far dies having relatively pointed cones, usually with a cone angle between 45° and 75°, have been used for extruding compound material having an aluminum core and a copper casing. The outer surface of the product has been satisfactory but the layer thickness has varied locally. The inner surface of the copper layer may look like an irregular mountain landscape with considerable differences in thickness and the products have not always fulfilled the requirements made upon them. According to proposed standards for compound wire of aluminum and copper having a 10 percent copper area, the smallest thickness of the copper layer may not at any point fall below 69 percent of the nominal thickness.

SUMMARY OF THE INVENTION

It has been found that the geometrical shape of the die has a completely different effect on the extrusion result than might be expected when extruding wire or rods having an aluminum core and a copper casing. It has been proved possible to reduce drastically the local variations in thickness of the copper layer by using dies with cones having a considerably greater cone angle than those used previously. If wire or rods are extruded having substantially circular cross-section, with an aluminum core and a copper casing, in dies having a cone with an angle of between 93° and 115°, then it is found with extrusion rations between 100:1 and 600:1 and 10 percent copper content that the products fulfil the standards required. Particularly good results are obtained if the cone angle is between 95° and 110°. Even higher extrusion ratios are also possible, even up to 1000:1.

BRIEF DESCRIPTION OF THE DRAWINGS

The invention will be sescribed more fully with reference to the accompanying drawings.

DESCRIPTION OF THE PREFERRED EMBODIMENTS

Figure 1:
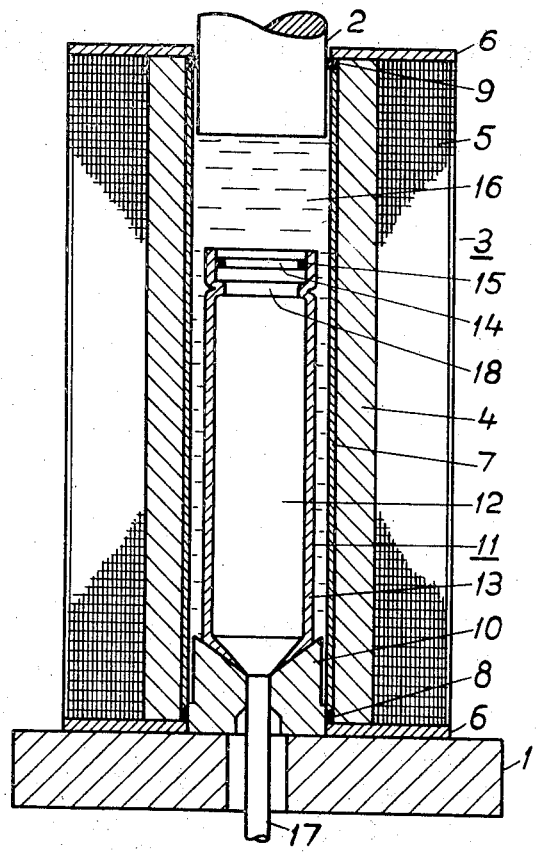
FIG. 1 shows schematically a section through a pressure chamber during extrusion of a billet and FIG. 2 shows on a larger scale a section through a die.
Figure 2:
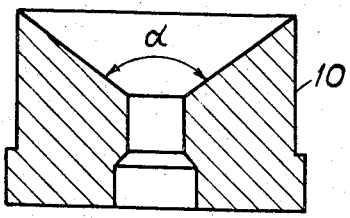

In the drawings 1 designates a press stand and 2 a pressure-generating piston arranged in a hydraulic press, not otherwise shown, in which there is a cylinder for operation of the piston 2. The pressure chamber includes a high pressure cylinder 3 constructed of a steel cylinder 4, a strip sheath 5 of rectangular high-strength strip metal wound on under pre-stressing, and end pieces 6. Between the end pieces 6 and a spacer 7, sealing rings 8 and 9 are arranged to provide seals between the cylinder 4 and the extrusion die 10 and the piston 2, respectively. In the pressure chamber is a billet 11 comprising a core 12 of aluminum or an aluminum alloy and a casing 13 of copper or a copper alloy surrounding the core. At the inner end of the billet there is an annular groove 14 in the core in which lies a ring 15 which prevents the pressure medium 16 from penetrating between the core and the casing. In this way the surfaces are kept free from contamination and a high pressure is obtained between the core and the casing which gives good adhesion. The adhesion can be further improved by providing the core 12 with an additional groove 18. An extruded wire is designated 17. In FIG. 2 the angle of the cone in the die is designated $\alpha$. The angle $\alpha$ lies between 93° and 115°.

I claim:

1. Method of manufacturing rods or wire of compound material having a core consisting essentially of aluminum and a casing consisting essentially of copper surrounding the core, by means of hydrostatic extrusion of a billet formed of a core and a casing surrounding the core and sealed against the core at the rear end of the billet, which comprises inserting the billet in a pressure chamber and extruding the billet under the influence of a hydrostatic pressure in a pressure medium in the chamber surrounding the billet through a die with an opening shaped to the desired cross-section, the die having a conical inlet, the angle of the cone being between 95° and 110°.

2. Method according to claim 1, in which the extrusion is carried out with an extrusion ratio between 100:1 and 1000:1.

* * * * *